May 2, 1967  V. J. JANDASEK  3,316,622
METHOD OF MAKING BLADED HYDROKINETIC MEMBERS
Original Filed Feb. 25, 1963  3 Sheets-Sheet 1

INVENTOR:
VLADIMIR J. JANDASEK
BY
ATTORNEYS.

May 2, 1967 V. J. JANDASEK 3,316,622
METHOD OF MAKING BLADED HYDROKINETIC MEMBERS
Original Filed Feb. 25, 1963 3 Sheets-Sheet 2

INVENTOR:
VLADIMIR J. JANDASEK
BY
ATTORNEYS.

May 2, 1967  V. J. JANDASEK  3,316,622
METHOD OF MAKING BLADED HYDROKINETIC MEMBERS
Original Filed Feb. 25, 1963  3 Sheets-Sheet 3

INVENTOR:
VLADIMIR J. JANDASEK
BY
ATTORNEYS.

United States Patent Office 3,316,622
Patented May 2, 1967

3,316,622
METHOD OF MAKING BLADED HYDRO-
KINETIC MEMBERS
Vladimir J. Jandasek, Dearborn, Mich., assignor to Ford Motor Company, Dearborn, Mich., a corporation of Delaware
Original application Feb. 25, 1963, Ser. No. 260,449. Divided and this application Jan. 29, 1965, Ser. No. 429,963
1 Claim. (Cl. 29—156.8)

This application is a division of my application Ser. No. 260,449, filed Feb. 25, 1963, now abandoned, which was a continuation-in-part of my application Ser. No. 606,897, filed Aug. 9, 1956, now Patent No. 3,078,740.

My invention relates generally to hydrokinetic torque transmitting mechanisms and more particularly to improvements in constructing and assembling components of a bladed hydrokinetic member such as the impeller of a hydrokinetic torque converter.

The improvement of my invention comprises a single shell construction for the hydrokinetic torque converter member.

According to a preferred form of my invention, the impeller shell defines the outer torus shroud for the toroidal fluid flow circuit of the torque converter and it also forms in part the means for retaining the impeller blades. The need for providing a separate outer shroud for retaining the blade elements thus is eliminated since the impeller shell itself performs this function.

It is an object of my invention to provide a method of making a simplified impeller construction that is adapted especially for high volume manufacturing techniques. This feature is achieved while eliminating manufacturing costs and reducing substantially the number of steps that are required during the manufacturing process.

It is another object of my invention to provide a method of making a hydrokinetic member for a torque converter unit having flow directing blades wherein the blades are secured within the torus circuit of the unit by means of cooperating projections formed on the blades and recesses formed in the torus shroud of the member.

For the purpose of describing more particularly the improvements of my invention, reference may be made to the accompanying drawings, wherein:

FIGURE 3A is a partial cross sectional view taken along section line 3A—3A of FIGURE 2;

FIGURE 4A is a cross sectional view taken along section line 4A—4A of FIGURE 4.

Figure 1:
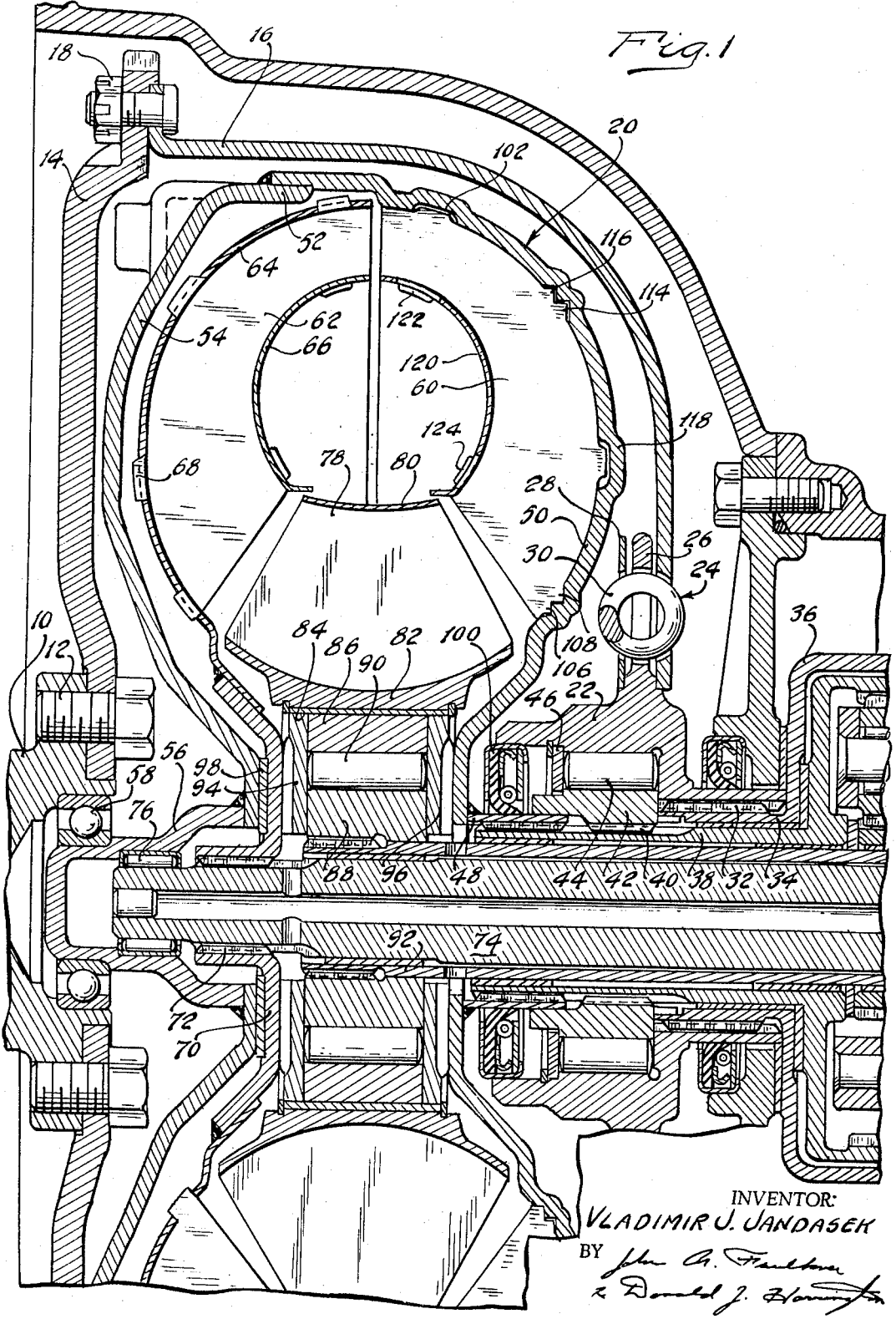
FIGURE 1 shows a cross sectional assembly view of a torque converter mechanism to which the improvement of my invention can be applied.

Referring first to FIGURE 1, numeral 10 designates a flanged end of a crankshaft for an internal combustion vehicle engine. It is bolted by means of bolts 12 to a drive plate 14 which is bolted at its periphery to a drive shell 16, suitable bolts 18 being provided for this purpose.

Drive shell 16 envelops the torque converter construction which is identified generally by reference character 20. It is connected to a hub 22 by means of a clutch damper spring assembly 24. This assembly comprises a radial extension 26 carried by the hub 22. The innermost portion of drive shell 16 is disposed on one side of the extension 26 and an annular plate 28 is situated on the other side. The extensions 26 are apertured to receive springs 30 which in turn are seated upon the ends of tangentially spaced openings in the plate 28 and the innermost portion of drive shell 16. Thus, a resilient connection is provided between drive shell 16 and hub 22.

Hub 22 is splined at 32 to a sleeve shaft 34 which in turn is connected to drum member 36. This drum member is connected to the carrier of an overdrive planetary gear unit. This will be apparent by referring to my Patent No. 3,078,740, which may be used to supplement my instant disclosure.

Disposed within sleeve shaft 34 is another sleeve shaft 38 which is connected to the ring gear of the previously mentioned overdrive planetary gear unit. This sleeve shaft is splined at 40 to an inner race 42 for an overrunning clutch. This clutch comprises overrunning clutch elements such as sprags or rollers 44 which are situated between hub 22 and race 42. Hub 22 functions as an outer race for the overrunning clutch elements 44. If rollers are employed, the hub 22 can be formed with cammed surfaces which cooperate with elements 44. In the alternative, elements 44 may be in the form of sprags which would require concentric cylindrical surfaces on the cooperating inner and outer races.

Elements 44 are held in place by a plate 46 which in turn is held axially fast by a snap ring.

Splined also to sleeve shaft 38 is a hub shaft 48 for the hydrokinetic impeller. This impeller comprises an outer shell 50 that is connected at its innermost periphery to the hub 48 by welding. The outer periphery of shell 50 is connected by welding to the outer periphery 52 of a second shell piece 54.

Impeller blades 60 are disposed within the interior of the shell 50. They define radial fluid outflow passages that are situated in juxtaposed fluid flow relationship with respect to radial inflow passages defined by turbine blades 62. These turbine blades are disposed between an outer turbine shroud 64 and an inner turbine shroud 66. Shroud 64 can be apertured to receive tabs 68 carried at the outer margins of the blades 62. The inner shroud 66 similarly may be formed with openings for the purpose of receiving tabs formed on the innermost margin of the blades 62. Shroud 66, of course, is annular in form.

Shroud 64 is secured at its innermost margin to the turbine hub 70 which in turn is splined at 72 to a turbine shaft 74, the latter forming a power delivery path to the gear unit, not shown. This gear unit, however, is described in my copending application. A pilot bearing 76 journals the left-hand end of shaft 74 within the hub 56.

A bladed reactor is situated between the flow exit section of the turbine and the entrance section of the impeller. It comprises a plurality of circumferentially spaced blades 78 situated between the first shroud 80 and a second shroud 82. The shroud 82 is formed with a splined opening 84 which receives an internally splined overrunning brake race 86. An inner overrunning brake race 88 is splined to a reactor shaft 92. This reactor shaft is connected to a stationary portion of the transmission mechanism. Situated between races 86 and 88 are overrunning brake elements 90 in the form of sprags or rollers.

Overrunning brake side members 94 and 96 are situated on either side of races 86 and 88. Members 94 and 96 are held axially fast to the race 82 by means of snap rings as indicated. They function also as thrust transmitting members which transmit thrust between the hubs of the impeller shell and the hub 70 of the turbine. A thrust washer 98 is situated between hub 70 and the hub 56.

The hub shaft 48 for the impeller and the hub 22 form a seal recess within which a seal 100 is situated.

Engine torque is delivered to the impeller from shaft 10, through the drive plate 14 and through the drive shell 16 to the race 42. The power flow path is defined in part by the overrunning coupling elements 44 which establish a driving connection between the races 22 and 42 in one direction although freewheeling motion of the race 42 with respect to the race 22 can be accommodated.

Hub shaft 48 and the impeller shell 50 then are driven, and this establishes toroidal fluid circulation in the torus circuit defined by the impeller and turbine members.

Figure 2:
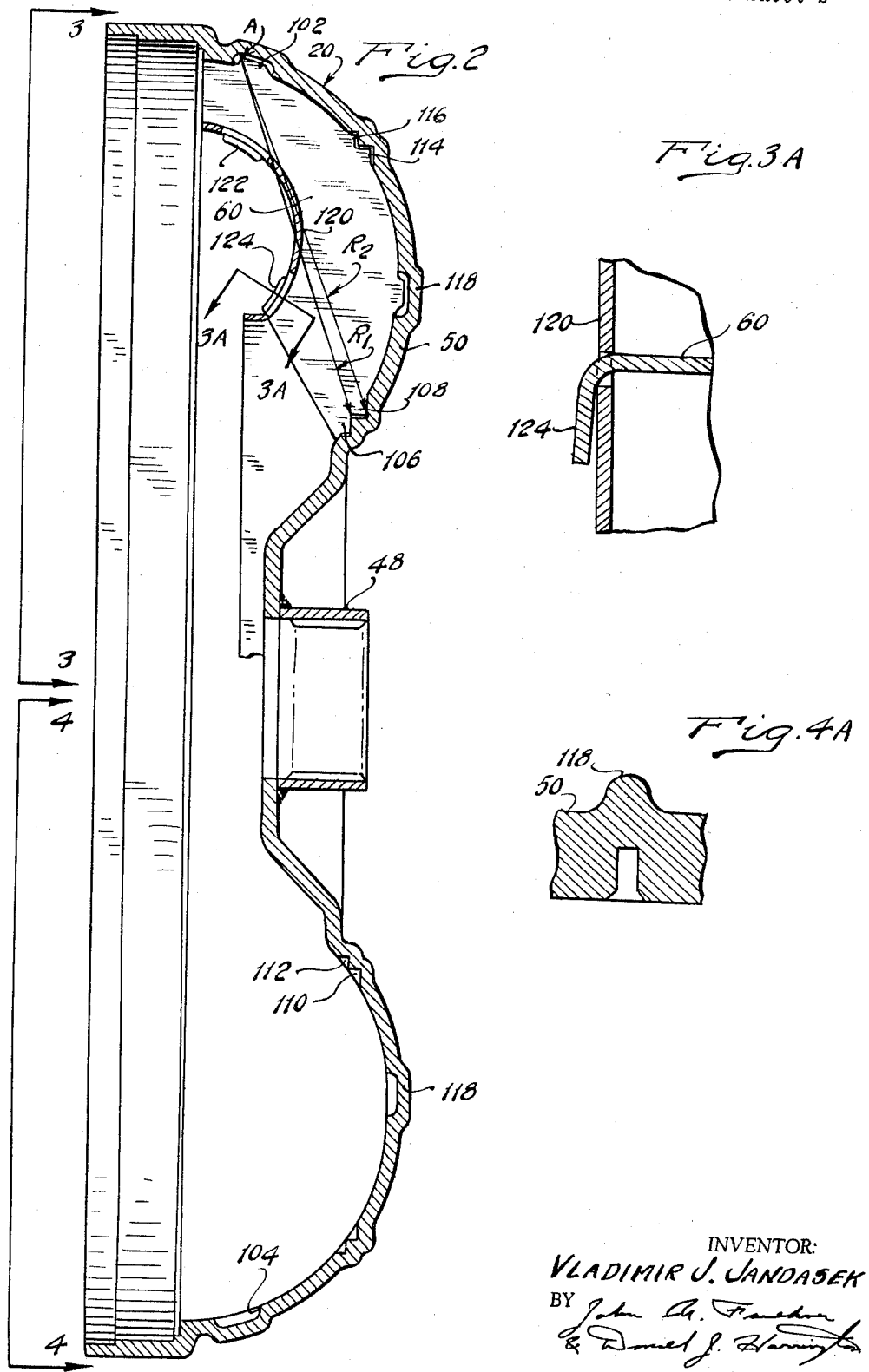
FIGURE 2 is a partial assembly view showing an enlargement of the impeller shell and blade construction of FIGURE 1.
Figure 3:
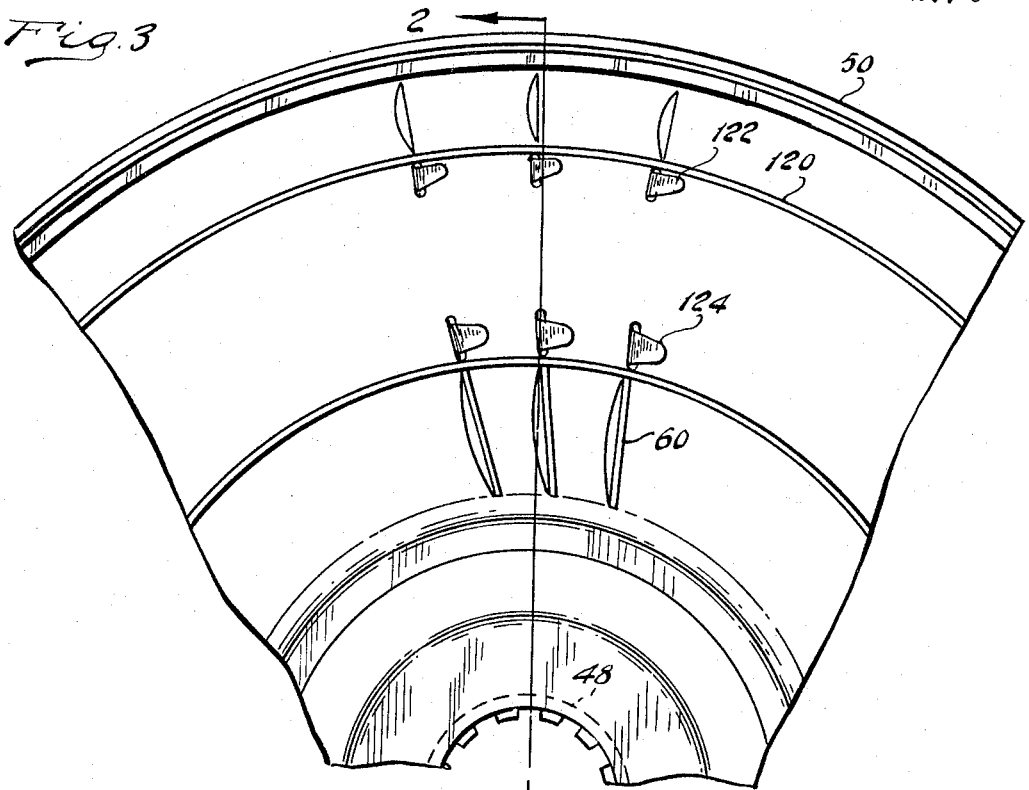
FIGURE 3 is an end view of the impeller construction from the plane of reference line 3—3 of FIGURE 2.

The means for retaining the blades 60 within the impeller shell can best be observed by referring to FIGURES 2 and 3. Each blade is formed with a plurality of projections on its outermost margin. A first projection is situated at the radially outermost portion of each blade 60 as indicated at 102. This projection 102 can be received within a cooperating slot that may be punched in the inner surface of the shell 50. This slot can be observed by referring to FIGURE 4 where it is identified by reference character 104.

Figure 4:
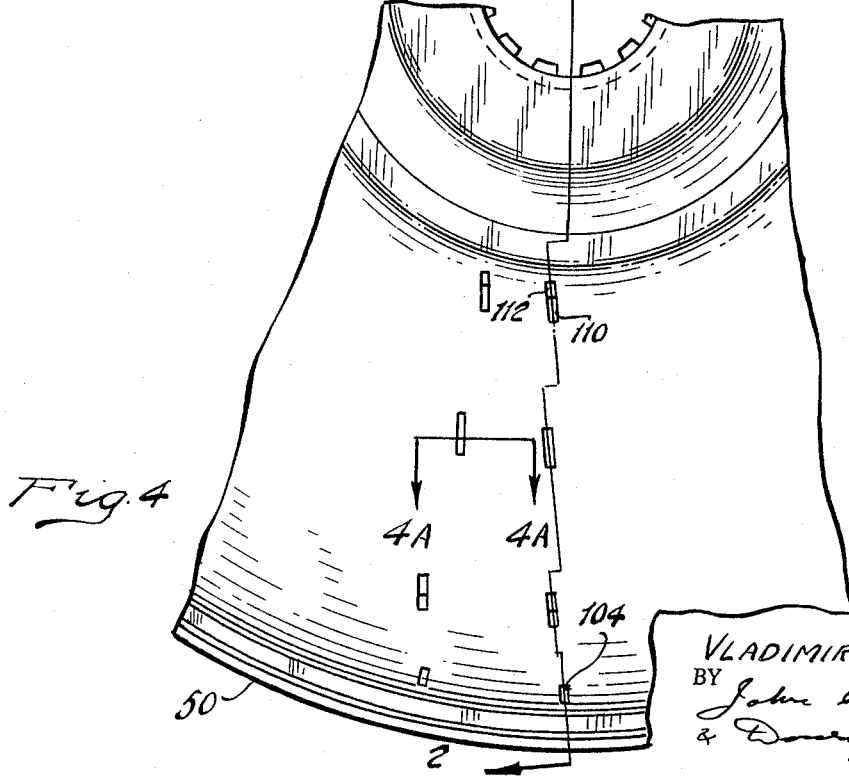
FIGURE 4 shows a portion of the outer shell of FIGURE 3 with the blades removed as viewed from the plane of reference line 4—4 of FIGURE 2.

The radially innermost portion of the outer margin of blades 60 is formed with a pair of projections 106 and 108 which are received within cooperating slots or grooves 110 and 112, the latter being punched in the inner surface of shell 50, as viewed in FIGURE 4. In a similar fashion, the outer margin of blades 60 can be formed also with projections 114, 116 and 118. Each of these projections may be received within a cooperating groove or slot formed in the inner surface of shell 50, as seen in FIGURES 4 and 4A. Since the blades 60 are provided with a curvature, the projections 118, 114 and 116 will be displaced tangentially with respect to the projections 106, 108 and 102. This is best observed also by viewing FIGURE 4.

The blades 60 are secured also to an inner impeller shroud 120. This is accomplished by forming tabs 122 and 124 on the inner margin of the blades 60 which in turn are received within cooperating slotted openings in the shroud 120. After they are inserted within these openings, the tabs 122 and 124 are bent over against the inner surface of the shroud 120 as indicated in FIGURE 3.

During assembly of the impeller blades, the shell 50 may be mounted upon a suitable fixture. Each blade 60 then can be inserted by receiving first the projection 102 within its cooperating groove 104. The blade then can be pivoted or rotated about the projection 102 in a generally tangential direction, and the projections 106 and 108 then can be aligned in registry with grooves 110 and 112. The dimensions of the projections 106 and 108 with respect to the internal dimensions of the shell 50 are such that the projections 106 and 108 will not be received normally within their cooperating grooves. To insert these projections in grooves 110 and 112 it is necessary to flex the blade slightly and force the innermost margin of the blade as the blade is turned about a reference line that passes through projection 102 in an axial direction. As this is done, of course, the projections 118, 114 and 116 are received without difficulty within their cooperating grooves since their geometry is such that no interference will be established between them and the inner surface of the shell 50. Once each blade 60 is assembled in this fashion, it will be retained in place in a fixed fashion. Tangential displacement of the blades upon application of hydrokinetic forces thereto will be resisted by reason of the action of each of the projections formed on the outer margins of the blades.

It will be apparent from an inspection of FIGURE 2 that the apex of the projections 106 and 108 cannot pass over the cooperating apices of the grooves 110 and 112 without interference. Once the projections 106 and 108 are in place, however, a clearance exists between the margins of the projections 106 and 108 and their cooperating grooves 110 and 112. There is no need, therefore, to rely upon the resiliency of the blade itself to retain the blades in place.

The blades are formed of stamped sheet metal and the tolerances of the blades with respect to the inner surface of the shell 50, as well as the tolerances of the projections with respect to the cooperating grooves, are sufficiently large to permit the resilient deformation to take place to permit the apices of the projections 106 and 108 to pass over the apices of the grooves 110 and 112. No other retaining means is required once the blades 60 are assembled in place.

Following this operation the inner shroud 120 is placed over the assembled blades 60 and the tabs 122 and 124 on the blades are received through cooperating slotted openings in the shroud 120. When the tabs 122 and 124 are bent as indicated in FIGURE 3, the impeller assembly operation is complete. The shroud 120, the blades 60 and the shell 50 form an integral, rigid structural assembly that is capable of withstanding any mechanical or hydrodynamic force that may be encountered during operation in an automotive vehicle driveline.

Following this assembly operation, the other assembly steps may be followed. This includes the assembly of the turbine, the stator sub-assembly and the welding of the shell piece 54 to the shell 50. The final product is a sealed assembly that need not be dismantled for servicing.

As best observed in FIGURE 2, the distance from point A on the projection 102 to the apex of the projection 108 is greater than the distance between the point A and the apex at the margin of the groove 112. These distances are identified respectively in FIGURE 2 by the symbols $R_2$ and $R_1$. The same relationship exists for projection 106 and groove 110.

The shroud 120 and the blades 60 cannot be removed by drawing them axially with respect to the axis of the hydrokinetic unit since this will be resisted by reason of the interference that exists between projection 102 and the groove 104. Also, pivotal movement of the blades 60 about the projection 102 cannot take place by reason of the previously described interference between the apices of the projections 106 and 108 and the corresponding apices of the recesses 110 and 112. Tangential displacement of the blades 60 does not take place, obviously, because of the resistance of yielding that is offered by the projections, including the projections 118, 114 and 116. It is apparent, therefore, that the blades 60 are held fast against displacement regardless of the reference axis that is considered.

Having thus described a preferred form of my invention, what I claim and desire to secure by U.S. Letters Patent is:

A method for assembling sheet metal blades within the torus shell of a hydrokinetic torque transmitting mechanism comprising the steps of forming a shell with a semi-toroidal shape and with a single thickness, piercing a series of slots at circumferentially spaced locations on the outer margin of the interior surface of said shell, piercing a series of slots in said interior shell surface at a radially inward location, the slots of each series being arranged in spaced circumferential relationship about the axis of said shell, piercing a series of additional slots in said interior shell surface at radial locations intermediate said radially inward slots and said radially outward slots, said intermediate slots being located at circumferentially spaced locations, the slots of each series being circumferentially offset with respect to corresponding slots of the other series, forming a plurality of flow directing blades with an outer margin that corresponds in shape to the toroidal shape of said interior surface, said blades being concave in shape to provide an optimum blade geometry consistent with the hydrokinetic characteristics of said mechanism, forming the outer margin of said blades with retaining tabs that are positioned at radial locations corresponding to the radial locations of said slots, flexing said blades and inserting said projections into said slots with each projection being in registry with one slot of the corresponding series formed in said shell, the outermost projections and the innermost projections being received within their respective slots with an interference fit whereby removal of said blades in a direction parallel to the axis of said shell is prevented, and securing the innermost margins of said blades to an inner shroud whereby said inner shroud, said shell and said blades cooperate to define a unitary assembly having radial flow passages, the blade retaining tabs on said blades and the cooperating slots in said shell having a radial clearance following assembly, said tabs and said slots providing the sole means for retaining said blades in assembled relationship with respect to said shell.

References Cited by the Examiner

UNITED STATES PATENTS

| | | | |
|---|---|---|---|
| 2,474,298 | 6/1949 | Zeidler | 103—115 |
| 2,505,820 | 5/1950 | Zeidler | 103—115 |
| 2,692,561 | 10/1954 | Zeidler | 103—115 |
| 2,779,292 | 1/1957 | Zeidler | 103—115 |
| 2,948,226 | 8/1960 | Smirl | 103—115 |
| 3,181,778 | 5/1965 | Mayne | 29—156.8 |

JOHN F. CAMPBELL, *Primary Examiner.*

P. M. COHEN, *Assistant Examiner.*